(12) United States Patent
Yang et al.

(10) Patent No.: US 11,293,128 B2
(45) Date of Patent: Apr. 5, 2022

(54) SHOCK ABSORBER FOR WASHING MACHINE AND WASHING MACHINE HAVING THE SAME (71) Applicant: WUXI LITTLE SWAN ELECTRIC CO., LTD., Wuxi (CN)

(72) Inventors: Weiguo Yang, Wuxi (CN); Yacheng Shi, Wuxi (CN); Wei Zhou, Wuxi (CN)

(*) Notice: Subject to any disclaimer, the term of this patent is extended or adjusted under 35 U.S.C. 154(b) by 169 days.

(21) Appl. No.: 16/647,472

(22) PCT Filed: Jan. 16, 2018

(86) PCT No.: PCT/CN2018/072821
§ 371 (c)(1),
(2) Date: Mar. 13, 2020

(87) PCT Pub. No.: WO2019/061957
PCT Pub. Date: Apr. 4, 2019

(65) Prior Publication Data
US 2020/0277724 A1 Sep. 3, 2020

(30) Foreign Application Priority Data
Sep. 30, 2017 (CN) .................. 201710923285.X (51) Int. Cl.
*F16F 13/00* (2006.01)
*D06F 37/20* (2006.01)
*F16F 15/02* (2006.01)

(52) U.S. Cl.
CPC ............ *D06F 37/20* (2013.01); *F16F 13/005* (2013.01); *F16F 15/022* (2013.01)

(58) Field of Classification Search
CPC .......... F16F 13/005; F16F 15/022; F16F 7/09; D06F 37/00
See application file for complete search history.

(56) References Cited

U.S. PATENT DOCUMENTS

| 4,934,493 A | * | 6/1990 | Bauer | D06F 37/20 |
| | | | | 188/381 |
| 9,127,396 B2 | * | 9/2015 | Yu | D06F 37/24 |

(Continued)

FOREIGN PATENT DOCUMENTS

| CN | 1572965 A | 2/2005 |
| CN | 101195955 A | 6/2008 |

(Continued)

OTHER PUBLICATIONS

OA for CN application 201710923285.X.
(Continued)

*Primary Examiner* — Thomas W Irvin
(74) *Attorney, Agent, or Firm* — Kilpatrick Townsend & Stockton, LLP (57) ABSTRACT

A shock absorber for a washing machine and a washing machine having the same are disclosed. The shock absorber includes: a shock absorber sleeve, and the shock absorber sleeve defines an accommodation cavity therein; a shock absorber rod, movably connected to the shock absorber sleeve; an elastic member provided on the shock absorber rod and/or the shock absorber sleeve; a first damping member fitted over the shock absorber rod and mounted on the shock absorber sleeve; and a second damping member mounted on the shock absorber rod and accommodated in the accommodation cavity. The first damping member and the second damping member generate damping when the shock absorber rod moves relative to the shock absorber sleeve. The shock absorber for the washing machine has a simple structure and favorable shock absorbing effects, and occupies little space.

16 Claims, 5 Drawing Sheets

(56) References Cited

U.S. PATENT DOCUMENTS

| | | | |
|---|---|---|---|
| 9,279,207 B2* | 3/2016 | Yu | D06F 37/24 |
| 9,469,929 B2* | 10/2016 | Park | F16F 13/005 |
| 9,951,454 B2* | 4/2018 | Jeon | D06F 37/24 |
| 9,963,814 B2* | 5/2018 | Kim | F16F 7/08 |
| 10,161,072 B2* | 12/2018 | Kim | D06F 37/20 |
| 10,407,814 B2* | 9/2019 | Kim | D06F 37/20 |
| 10,501,881 B2* | 12/2019 | Jung | D06F 37/24 |
| 2011/0308281 A1 | 12/2011 | Yu et al. | |
| 2015/0069684 A1* | 3/2015 | Park | F16F 15/08 267/140.13 |

FOREIGN PATENT DOCUMENTS

| | | |
|---|---|---|
| CN | 101994233 A | 3/2011 |
| CN | 201952643 U | 8/2011 |
| CN | 102345221 A | 2/2012 |
| CN | 202786812 U | 3/2013 |
| CN | 104278484 A | 1/2015 |
| CN | 105908447 A | 8/2016 |
| JP | 2006230591 A | 9/2006 |
| JP | 2010104578 A | 5/2010 |
| JP | 2014050502 A | 3/2014 |
| JP | 2015016076 A | 1/2015 |
| KR | 20090012698 U | 12/2009 |
| KR | 20120125084 A | 11/2012 |

OTHER PUBLICATIONS

English translation of OA for CN application 201710923285.X.
OA for IN application 202027017978.
International Search Report dated Jun. 22, 2018 in the corresponding International Application No. PCT/CN2018/072821.
The second Office Action dated Mar. 26, 2020 corresponding to CN Application No. 201710923285.X.
International Search Report dated Jun. 22, 2018 corresponding to International Application No. PCT/CN2018/072821.

* cited by examiner

SHOCK ABSORBER FOR WASHING MACHINE AND WASHING MACHINE HAVING THE SAME

CROSS-REFERENCES TO RELATED APPLICATIONS

The present disclosure is a national phase application of International Application No. PCT/CN2018/072821, filed on Jan. 16, 2018, which claims the priority of Chinese Application No. 201710923285.X, filed in the Chinese Patent Office on Sep. 30, 2017, the entireties of which are herein incorporated by reference.

FIELD

The present disclosure relates to the field of electric appliance manufacturing technologies, and particularly to a shock absorber for a washing machine and a washing machine having the same.

BACKGROUND

In a traditional washing machine with an impeller, a hanging mechanism is configured in the form of a suspension rod which has a damping function and the following defects at the same time.

(1) When the washing machine is washing a laundry, a cabinet is prone to be hit in the case of large eccentricity and relatively large vibrations of the laundry.

(2) When the washing machine is spinning at a low speed, the suspension rod does not provide good support, and a tub shakes greatly and is liable to hit the cabinet.

(3) The suspension rod occupies a large space, to reduce a capacity of the washing machine.

Due to the above-mentioned disadvantages, when the laundry is washed by the traditional suspension rod type washing machine, the tub is prone to impact the cabinet and then transmits the vibration thereof to the cabinet, resulting in a large vibration noise.

SUMMARY

The present disclosure seeks to solve at least one of the problems existing in the related art to at least some extent.

To this end, the present disclosure proposes a shock absorber for a washing machine, which has a simple structure and a good damping effect and occupies a small space.

The present disclosure further proposes a washing machine having the shock absorber.

A shock absorber for a washing machine according to an embodiment of a first aspect of the present disclosure includes: a shock absorber sleeve, having an accommodation cavity defined therein; a shock absorber rod connected with the shock absorber sleeve movably; an elastic member provided on the shock absorber rod and/or the shock absorber sleeve; a first damping member fitted over the shock absorber rod and mounted on the shock absorber sleeve; and a second damping member mounted on the shock absorber rod and accommodated in the accommodation cavity, and the first and second damping members provide a damping action when the shock absorber rod and the shock absorber sleeve move relative to each other.

With the shock absorber according to the embodiment of the present disclosure, by providing the first damping member which may abut against the shock absorber rod when the shock absorber rod moves relative to the shock absorber sleeve, the damping action is provided when the shock absorber rod moves relative to the shock absorber sleeve; by providing the second damping member located in the accommodation cavity on the shock absorber rod, when the shock absorber rod is shaking, the second damping member rubs against an inner wall surface of the accommodation cavity to provide the damping action, to reduce a vibration effectively, which may reduce the shake of the washing machine when applied to the washing machine; further, the shock absorber occupies the small space, releasing a capacity of the washing machine.

According to one embodiment of the present disclosure, the shock absorber further includes: an upper support provided on the shock absorber rod and away from the shock absorber sleeve; and a lower support provided on the shock absorber sleeve, with two ends of the elastic member abutting against the upper support and the lower support respectively.

According to one embodiment of the present disclosure, the lower support is fitted over the shock absorber rod support and fixedly connected with the shock absorber sleeve.

According to one embodiment of the present disclosure, the shock absorber sleeve is provided with an opening configured to mount the shock absorber rod, and the first damping member is provided close to the opening and is in interference fit with the shock absorber rod.

According to one embodiment of the present disclosure, the shock absorber further includes a limiter provided at an opening of the accommodation cavity and located between the shock absorber sleeve and the lower support, and the first damping member is located between the limiter and the lower support.

According to one embodiment of the present disclosure, the lower support includes a mounting post having one end abutting against the shock absorber sleeve and defining a channel therein for the shock absorber rod to pass through, the first damping member being provided in the channel and the limiter abutting against the first damping member.

According to one embodiment of the present disclosure, the lower support further includes a mounting portion extending from the mounting post towards a side away from the first damping member and snapped with the shock absorber sleeve.

According to one embodiment of the present disclosure, a boss is provided at a joint between the shock absorber sleeve and the lower support, protrudes outwards in a circumferential direction of the shock absorber sleeve, and is provided with a catch groove fitted with the mounting portion.

According to one embodiment of the present disclosure, the mounting portion is provided with a jaw snapped in the catch groove.

According to one embodiment of the present disclosure, the second damping member is fixed at one end of the shock absorber rod, and a gap exists between an outer wall surface of the second damping member and an inner wall surface of the accommodation cavity.

According to one embodiment of the present disclosure, the shock absorber further includes a mounting nut provided at one end of the shock absorber rod to fix the second damping member.

A washing machine according to an embodiment of a second aspect of the present disclosure includes the shock absorber according to the above-mentioned embodiments.

BRIEF DESCRIPTION OF THE DRAWINGS

The above-mentioned and/or additional aspects and advantages of the present disclosure will become apparent and more readily appreciated from the following descriptions of the embodiments made with reference to the drawings, in which.

REFERENCE NUMERALS shock absorber 100;

shock absorber sleeve 10; accommodation cavity 11; exhaust hole 12; boss 13; catch groove 14; mounting hole 15; mounting thread 16; limiter 17;

shock absorber rod 20; mounting nut 21;

elastic member 30;

first damping member 40;

upper support 50;

lower support 60; mounting post 61; channel 611; limiting portion 62; stop rib 63;

mounting portion 64;

second damping member 80.

DETAILED DESCRIPTION OF THE DISCLOSURE

Reference will be made in detail to embodiments of the present application, and the examples of the embodiments are illustrated in the drawings, and the same or similar elements and the elements having same or similar functions are denoted by like reference numerals throughout the descriptions. The embodiments described herein with reference to drawings are illustrative, and merely used to explain the present application. The embodiments shall not be construed to limit the present application.

In the description of the present application, it is to be understood that terms such as "upper", "lower", "vertical", "horizontal", "top", "bottom", "inner", "outer", "axial", "radial", and "circumferential" should be construed to refer to the orientation as then described or as shown in the drawings under discussion. These relative terms are for convenience of description and do not require that the present application be constructed or operated in a particular orientation, thus cannot be construed to limit the present application. Furthermore, in the description of the present disclosure, "a plurality of" means two or more unless otherwise stated.

In the description of the present disclosure, it should be noted that unless specified or limited otherwise, the terms "mounted", "connected", and "coupled" and the like are used broadly, and may be, for example, fixed connections, detachable connections, or integral connections; may also be mechanical connections or electrical connections; may also be direct connections or indirect connections via intervening structures; may also be inner communications of two elements.

A shock absorber 100 for a washing machine according to an embodiment of the present disclosure will be described below with reference to accompanying drawings.

As shown in FIGS. 1 to 5, the shock absorber 100 according to the embodiment of the present disclosure includes a shock absorber sleeve 10, a shock absorber rod 20, an elastic member 30, a first damping member 40, and a second damping member 80.

In one embodiment, an accommodation cavity 11 is defined in the shock absorber sleeve 10, the shock absorber rod 20 is connected with the shock absorber sleeve 10 movably, the elastic member 30 is provided on the shock absorber rod 20 and/or the shock absorber sleeve 10, the first damping member 40 is fitted over the shock absorber rod 20 and mounted on the shock absorber sleeve 10, the second damping member 80 is mounted on the shock absorber rod 20 and received in the accommodation cavity 11, and the first and second damping members 40, 80 provide a damping action when the shock absorber rod 20 and the shock absorber sleeve 10 move relative to each other.

In other words, the shock absorber 100 according to the embodiment of the present disclosure may be applied between a pedestal and a drain pan (not shown) of the washing machine, may extend substantially in a vertical direction, and has a lower end connected with the pedestal of the washing machine and an upper end connected with the drain pan or other supporting structures of the washing machine to realize supporting and damping functions. The shock absorber 100 mainly includes the shock absorber sleeve 10, the shock absorber rod 20, the elastic member 30 and the first and second damping members 40, 80, and the shock absorber sleeve 10 is provided therein with the accommodation cavity 11 and an exhaust hole 12 in communication with the accommodation cavity 11, a lower end of the shock absorber rod 20 is inserted into the accommodation cavity 11 movably, and the elastic member 30 is provided between upper ends of the shock absorber rod 20 and the shock absorber sleeve 10, and pressed when the shock absorber rod 20 moves into the accommodation cavity 11, to provide damping and buffering functions.

The first damping member 40 is mounted on the shock absorber sleeve 10 and fitted over the shock absorber rod 20, at least a part of the first damping member 40 abuts against the shock absorber rod 20, and the first damping member 40 rubs against the shock absorber rod 20 to provide a damping action when the shock absorber rod 20 moves up and down relative to the shock absorber sleeve 10, which may control the shake of the shock absorber rod 20 relative to the shock absorber sleeve 10. The second damping member 80 may be mounted at the lower end of the shock absorber rod 20, and the lower end of the shock absorber rod 20 may be inserted into the accommodation cavity 11, to enable the second damping member 80 to be accommodated in the accommodation cavity 11; when the shock absorber rod 20 shakes left and right, a relative movement occurs between the second damping member 80 and an inner wall surface of the accommodation cavity 11 to provide the damping action for shake reduction. When the shock absorber rod 20 shakes up and down as well as left and right, the first and second damping members 40 and 80 act simultaneously and provide the damping action to reduce shake, to further control a movement of a tub assembly of the washing machine, reducing the shake of the washing machine, and lowering a probability that the tub assembly impacts a cabinet.

Thus, with the shock absorber 100 according to the embodiment of the present disclosure, by providing the first damping member 40 which may abut against the shock absorber rod 20 when the shock absorber rod 20 moves relative to the shock absorber sleeve 10, the damping action is provided when the shock absorber rod 20 moves relative to the shock absorber sleeve 10; by providing the second damping member 80 located in the accommodation cavity 11 on the shock absorber rod 20, when the shock absorber rod 20 is shaking, the second damping member 80 rubs against an inner wall surface of the accommodation cavity 11 to provide the damping action, to reduce a vibration effectively. That is the shake of the washing machine may be reduced; further, the shock absorber occupies the small space, releasing a capacity of the washing machine.

According to one embodiment of the present disclosure, the shock absorber sleeve 10 is formed substantially to be cylindrical, and one end of the shock absorber rod 20 is inserted into the accommodation cavity 11 movably in an axial direction of the shock absorber sleeve 10.

Figure 2:
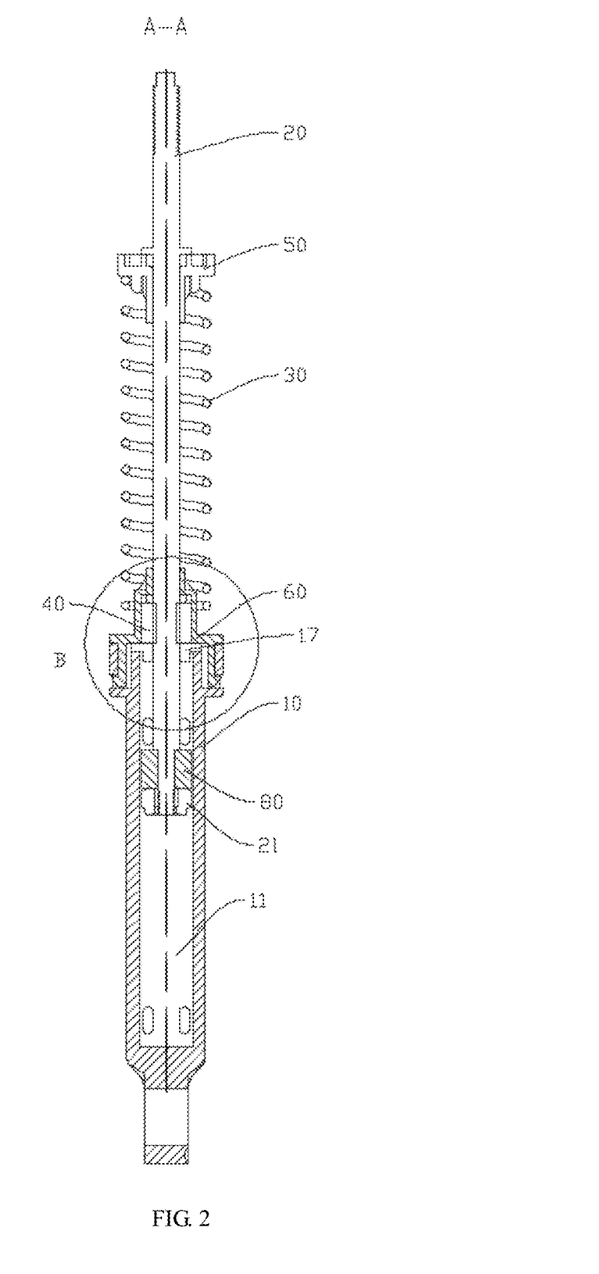
FIG. 2 is a sectional view taken along a line A-A in FIG. 1.
Figure 5:
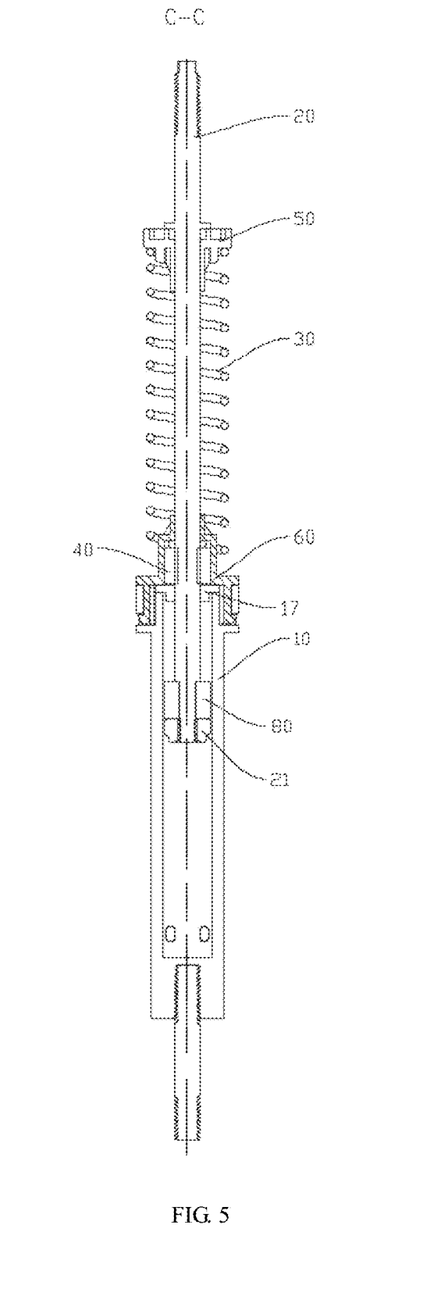
FIG. 5 is a sectional view taken along a line C-C in FIG. 4.

In one embodiment, as shown in FIGS. 2 and 5, the shock absorber sleeve 10 is formed substantially into a cylindrical structure extending in a vertical direction, the accommodation cavity 11 is provided in the shock absorber sleeve 10 and also recessed in the vertical direction, and an upper end of the accommodation cavity 11 is open to accommodate the lower end of the shock absorber rod 20, the lower end of the shock absorber rod 20 being inserted into the accommodation cavity 11 and movable in the vertical direction. When the shock absorber rod 20 moves downwards, the accommodation cavity 11 is filled with the shock absorber rod 20 gradually, and air in the accommodation cavity 11 may be discharged from the exhaust hole 12. Meanwhile, the first damping member 40 may rub against the shock absorber rod 20 to provide the damping action, to reduce the vibration. The shock absorber 100 having such a structure has a small length, to limit the movement of the tub assembly when the washing machine is washing the laundry, reducing the shake, occupying a small space at a bottom of the washing machine, and releasing a capacity of the washing machine.

According to some embodiments of the present disclosure, the shock absorber 100 further includes an upper support 50 and a lower support 60. The upper support 50 is provided on the shock absorber rod 20 and away from the shock absorber sleeve 10, and the lower support 60 is provided on the shock absorber sleeve 10, with two ends of the elastic member 30 abutting against the upper and lower supports 50 and 60 respectively.

Figure 3:
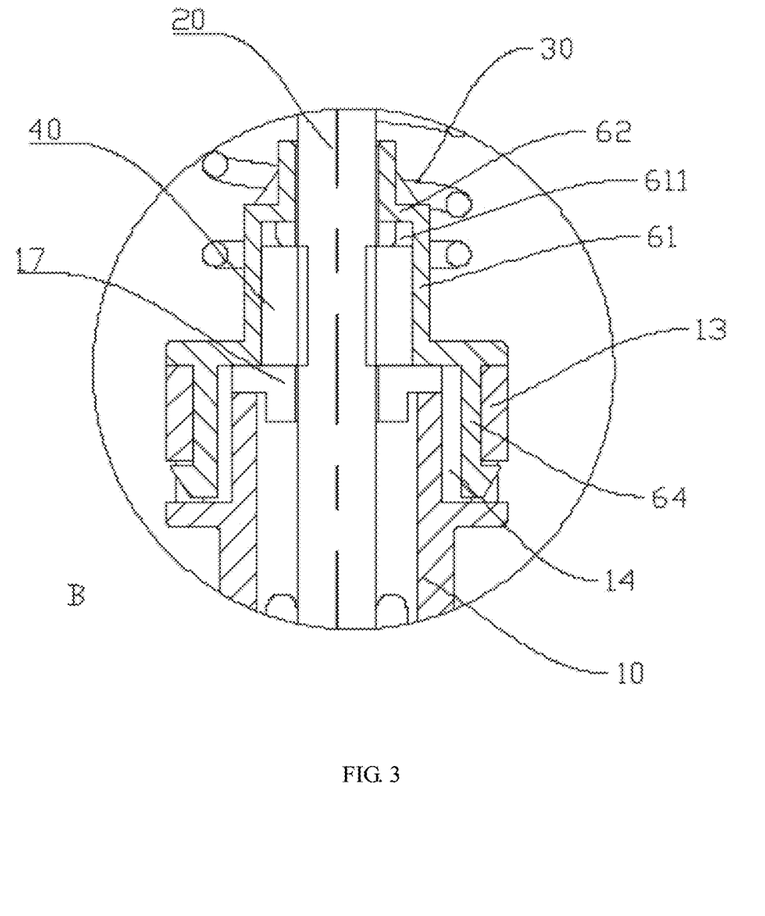
FIG. 3 is a schematic partial enlarged diagram of B in FIG. 2.

In one embodiment, as shown in FIGS. 2 and 3, the upper support 50 is provided close to an upper end of the shock absorber rod 20, the lower support 60 is provided at the upper end of the shock absorber sleeve 10, the lower end of the shock absorber rod 20 penetrates through the lower support 60 to be inserted into the accommodation cavity 11, the elastic member 30 may be configured as a spring fitted over the shock absorber rod 20, and the spring has an upper end abutting against the upper support 50 and a lower end abutting against the lower support 60. When the shock absorber rod 20 receives a force to move downwards, the upper support 50 moves downwards therewith, the lower end of the spring is fixed by the lower support 60, thus the spring is pressed downwards by the upper support 50, and an elastic acting force of the spring damps and buffers the shock absorber rod 20. When the downward force on the shock absorber rod 20 disappears, the spring pushes the upper support 50 upwards under the action of the elastic acting force of the spring, to drive the shock absorber rod 20 to restore to an initial state. Thus, in the shock absorber 100, the spring is mounted and fixed by the upper and lower supports 50 and 60, and the tub assembly is controlled to move by elasticity release of the spring and the damping actions of the damping members, with a more reasonable structure and better buffering and damping effects. Further, the length of the shock absorber 100 may be controlled effectively, and the capacity of the washing machine is further released.

In one embodiment, the lower support 60 is fitted over the shock absorber rod 20 and connected with the shock absorber sleeve 10 fixedly. Further, the shock absorber sleeve 10 is provided with an opening for mounting the shock absorber rod 20, and the first damping member 40 is provided close to the opening and in interference fit with the shock absorber rod 20.

The upper and lower supports 50 and 60 are fitted over the shock absorber rod 20 respectively. That is, the upper and lower supports 50 and 60 are formed into annular structures respectively, the upper support 50 having the annular structure may facilitate fixation of the upper end of the spring, and the lower support 60 having the annular structure may facilitate fixation of the lower end of spring and cooperation between the first damping member 40 and the shock absorber sleeve 10, with a more reasonable structure and more convenient assembly.

A fixed position of the first damping member 40 may be regulated based on the structure of the shock absorber 100, as long as the shock absorber rod 20 may be rubbed to provide the damping action when moving relative to the shock absorber sleeve 10. Since the second damping member 80 is mounted at a part of the shock absorber rod 20 extending into the accommodation cavity 11, in order to mount the second damping member 80 conveniently, the accommodation cavity 11 is required to be provided with the large opening. Therefore, according to one embodiment of the present disclosure, to mount the first damping member 40 conveniently, the shock absorber 100 further includes a limiter 17 provided at the opening of the accommodation cavity 11 and located between the shock absorber sleeve 10 and the lower support 60, and the first damping member 40 is located between the limiter 17 and the lower support 60.

That is, in the present embodiment, the first damping member 40 is provided at the opening at the upper end of the shock absorber sleeve 10 and located between the upper end of the shock absorber sleeve 10 and the lower support 60, and the limiter 17 is provided at the opening of the shock absorber sleeve 10 and limits the first damping member 40 cooperating with the lower support 60. That is, the first damping member 40 is mounted on the shock absorber sleeve 10 by cooperating the lower support 60 with the limiter 17, and formed into a hollow cylindrical shape, and the lower end of the shock absorber rod 20 penetrates through the first damping member 40 and the limiter 17 to extend into the accommodation cavity 11. When the shock absorber rod 20 moves up and down, the first damping member 40 is limited between the lower support 60 and the limiter, the shock absorber rod 20 rubs against the first damping member 40 to provide the damping action. Thus, the first damping member 40 having the structure is convenient to assemble, does not affect normal assembly of the second damping member 80, has a large surface of contact with the shock absorber rod 20, and may guarantee a damping effect.

As shown in FIG. 3, in some embodiments of the present disclosure, the lower support 60 includes a mounting post 61 and a limiting portion 62.

In one embodiment, the mounting post 61 has one end abutting against the shock absorber sleeve 10 and a channel 611 defined therein for the shock absorber rod 20 to penetrate through, the first damping member 40 is provided in the channel 611, and the limiter 17 abuts against the first damping member 40.

That is, the lower support 60 is fitted over the shock absorber rod 20 and mainly includes the mounting post 61 and the limiting portion 62, and the mounting post 61 is formed into a hollow cylindrical shape extending up and down, and a lower end of the mounting post 61 abuts against the upper end of the limiter 17, after the first damping member 40 is mounted in the channel 611, the lower end thereof may abut against the upper end of the limiter 17, to restrain the first damping member 40 from moving downwards.

The limiting portion 62 is provided at the upper end of the mounting post 61 and may be configured as an annular blocking piece extending inwards in a circumferential direction of the mounting post 61, and the upper end of the first damping member 40 may be stopped by the limiting portion 62, to limit the first damping member 40 to move in the channel 611 and guaranteeing overall structural stability of the shock absorber 100.

In one embodiment, the lower support 60 according to the embodiment of the present disclosure further includes a plurality of stop ribs 63, which extend in an axial direction of the mounting post 61 and is provided on an outer surface of the mounting post 61 at intervals in the circumferential direction of the mounting post 61, and one end of the spring abuts against the stop rib 63.

Figure 1:
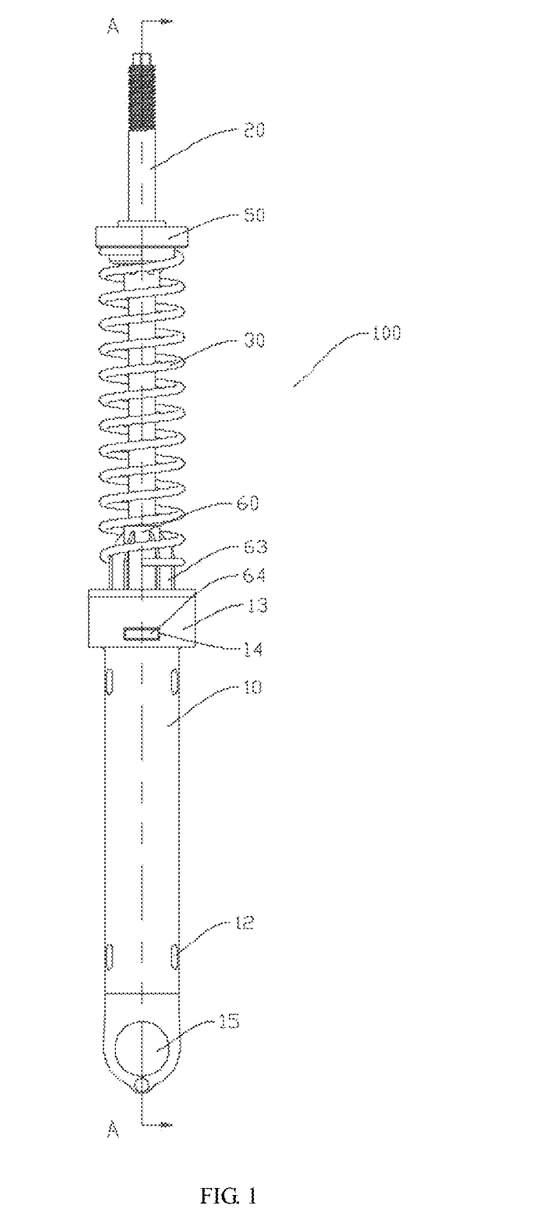
FIG. 1 is a schematic structural diagram of a shock absorber for a washing machine according to an embodiment of the present disclosure.
Figure 4:
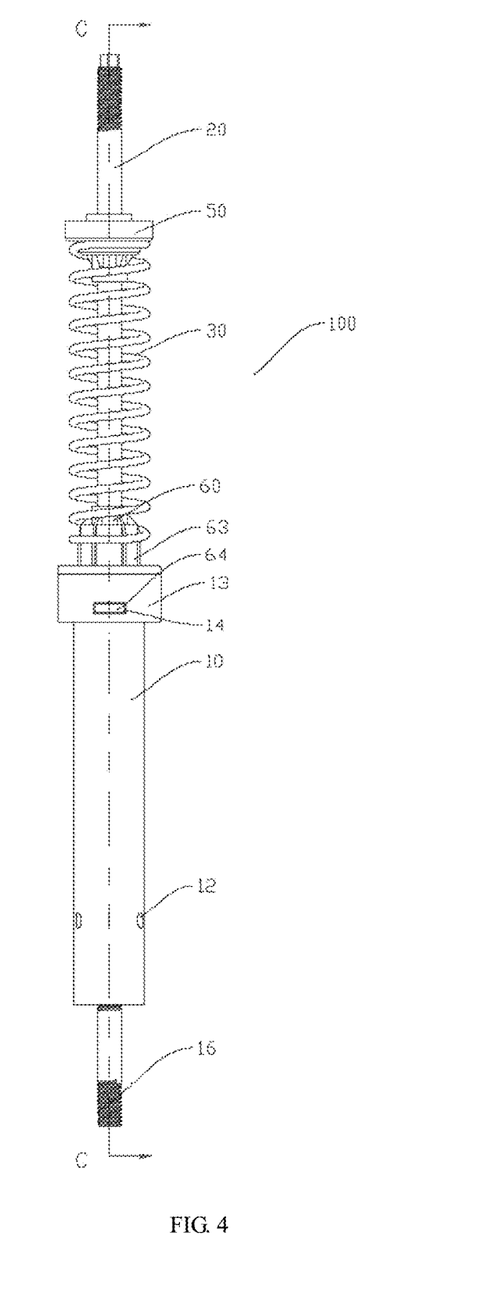
FIG. 4 is a schematic structural diagram of a shock absorber for a washing machine according to another embodiment of the present disclosure.

In one embodiment, as shown in FIGS. 1 and 4, the outer surface of the mounting post 61 is provided with the plurality of stop ribs 63 extending up and down and protruding outwards along the outer surface of the mounting post 61, and a protruding length is increased gradually from top to bottom until a size of the stop rib 63 corresponds to a size of the spring. Thus, the plurality of stop ribs 63 provided on the lower support 60 may cooperate with the spring conveniently.

According to one embodiment of the present disclosure, the lower support 60 further includes a mounting portion 64 extending from the mounting post 61 towards the side away from the first damping member 40 and snapped with the shock absorber sleeve 10. That is, the mounting portion 64 is provided at the lower end of the mounting post 61 and snapped at the upper end of the shock absorber sleeve 10. Thus, since the lower support 60 is snapped with the shock absorber sleeve 10, components and parts are more convenient to assemble and replace.

In some embodiments of the present disclosure, a boss 13 is provided at a joint between the shock absorber sleeve 10 and the lower support 60, protrudes outwards in the circumferential direction of the shock absorber sleeve 10 and is provided with a catch groove 14 fitted with the mounting portion 64, and a jaw is provided on the mounting portion 64 and snapped in the catch groove 14. Thus, the fitting structure is simple, feasible and convenient to manufacture and assemble, and has a low cost.

In some embodiments of the present disclosure, the lower support 60 is configured as an integrally formed part. That is, the mounting post 61, the limiting portion 62, the stop rib 63 and the mounting portion 64 of the lower support 60 may all be integrally formed. Thus, the integrally formed structure may not only guarantee the overall structural stability and increase a rigidity of the shock absorber 100, the shock absorber is not prone to be deformed and damaged, but also be convenient to mold, and have a low cost.

According to one embodiment of the present disclosure, the second damping member 80 is fixed at one end of the shock absorber rod 20, and a gap exists between the outer wall surface of the second damping member 80 and the inner wall surface of the accommodation cavity 11. In one embodiment, the shock absorber 100 further includes a mounting nut 21 provided at one end of the shock absorber rod 20 to fix the second damping member 80.

That is, the second damping member 80 is formed substantially to be cylindrical and mounted at the lower end of the shock absorber rod 20 by the mounting nut 21. Thus, the second damping member 80 has a simple structure and is convenient to assemble.

In view of different structures of the washing machine, the structure of the shock absorber 100 may also be regulated reasonably as required. In some embodiments of the present disclosure, as shown in FIGS. 1 and 2, a mounting hole 15 is provided at one end of the shock absorber sleeve 10 and away from the shock absorber rod 20, and the shock absorber sleeve 10 is mounted on the pedestal of the washing machine by penetrating a hinge through the mounting hole 15.

In some other embodiments of the present disclosure, mounting thread 16 is provided at one end of the shock absorber sleeve 10 and away from the shock absorber rod 20, and the shock absorber sleeve 10 is mounted on the pedestal of the washing machine through the mounting thread 16. Thus, the shock absorber 100 according to the embodiment of the present disclosure may be applied to various washing machines having different structures, and has a wide range of application.

The washing machine according to the embodiment of the present disclosure includes the shock absorber 100 according to the above-mentioned embodiments, and may be an impeller washing machine or a drum washing machine. The shake of the tub assembly may be reduced effectively, the shock absorber 100 occupies the small space at the bottom of the washing machine, and the capacity of the washing machine may be released.

Other components and operations of the washing machine according to the embodiments of the present disclosure.

In the description of the present specification, reference throughout this specification to "an embodiment", "some embodiments", "exemplary embodiment", "example", "specific example", "some examples" or the like means that a particular feature, structure, material, or characteristic described in connection with the embodiment or example is included in at least one embodiment or example of the present disclosure. In the specification, the schematic expressions to the above-mentioned terms are not necessarily referring to the same embodiment or example. Furthermore, the described particular features, structures, materials, or characteristics may be combined in any suitable manner in one or more embodiments or examples.

What is claimed is:

1. A shock absorber for a washing machine, comprising:
    a shock absorber sleeve having an accommodation cavity defined therein;
    a shock absorber rod movably connected with the shock absorber sleeve;
    an elastic member provided on the shock absorber rod and/or the shock absorber sleeve;
    a first damping member fitted over the shock absorber rod and mounted on the shock absorber sleeve;
    a second damping member mounted on the shock absorber rod and accommodated in the accommodation cavity, wherein the first and second damping members generate damping when the shock absorber rod and the shock absorber sleeve move relative to each other;
    an upper support provided on the shock absorber rod and away from the shock absorber sleeve;

a lower support provided on the shock absorber sleeve, with two ends of the elastic member abutting against the upper support and the lower support respectively; and a limiter provided at an opening of the accommodation cavity and located between the shock absorber sleeve and the lower support, the first damping member being located between the limiter and the lower support;

wherein the shock absorber sleeve is provided with an opening configured to mount the shock absorber rod, and the first damping member is arranged close to the opening and is in interference fit with the shock absorber rod.

2. The shock absorber according to claim 1, wherein the lower support is fitted over the shock absorber rod and fixedly connected with the shock absorber sleeve.

3. The shock absorber according to claim 1, wherein the lower support comprises:

a mounting post having one end abutting against the shock absorber sleeve, and defining a channel therein for the shock absorber rod to pass through, the first damping member being arranged in the channel and the limiter abutting against the first damping member.

4. The shock absorber according to claim 3, wherein the lower support further comprises:

a mounting portion extending from the mounting post towards a side away from the first damping member and snapped with the shock absorber sleeve.

5. The shock absorber according to claim 4, wherein a boss is provided at a joint between the shock absorber sleeve and the lower support, protrudes outwards in a circumferential direction of the shock absorber sleeve, and is provided with a catch groove fitted with the mounting portion.

6. The shock absorber according to claim 5, wherein the mounting portion is provided with a jaw snapped in the catch groove.

7. The shock absorber according to claim 1, wherein the second damping member is fixed at one end of the shock absorber rod, and a gap exists between an outer wall surface of the second damping member and an inner wall surface of the accommodation cavity.

8. The shock absorber according to claim 1, further comprising:

a mounting nut provided at one end of the shock absorber rod to fix the second damping member.

9. A washing machine, comprising:
a shock absorber for the washing machine, comprising:
a shock absorber sleeve having an accommodation cavity defined therein;
a shock absorber rod movably connected with the shock absorber sleeve;
an elastic member provided on the shock absorber rod and/or the shock absorber sleeve;
a first damping member fitted over the shock absorber rod and mounted on the shock absorber sleeve;
a second damping member mounted on the shock absorber rod and accommodated in the accommodation cavity, wherein the first and second damping members generate damping when the shock absorber rod and the shock absorber sleeve move relative to each other;
an upper support provided on the shock absorber rod and away from the shock absorber sleeve;
a lower support provided on the shock absorber sleeve, with two ends of the elastic member abutting against the upper support and the lower support respectively; and
a limiter provided at an opening of the accommodation cavity and located between the shock absorber sleeve and the lower support, the first damping member being located between the limiter and the lower support;
wherein the shock absorber sleeve is provided with an opening configured to mount the shock absorber rod, and the first damping member is arranged close to the opening and is in interference fit with the shock absorber rod.

10. The washing machine according to claim 9, wherein the lower support is fitted over the shock absorber rod and fixedly connected with the shock absorber sleeve.

11. The washing machine according to claim 9, wherein the lower support comprises:

a mounting post having one end abutting against the shock absorber sleeve, and defining a channel therein for the shock absorber rod to pass through, the first damping member being arranged in the channel and the limiter abutting against the first damping member.

12. The washing machine according to claim 11, wherein the lower support further comprises:

a mounting portion extending from the mounting post towards a side away from the first damping member and snapped with the shock absorber sleeve.

13. The washing machine according to claim 12, wherein a boss is provided at a joint between the shock absorber sleeve and the lower support, protrudes outwards in a circumferential direction of the shock absorber sleeve, and is provided with a catch groove fitted with the mounting portion.

14. The washing machine according to claim 13, wherein the mounting portion is provided with a jaw snapped in the catch groove.

15. The washing machine according to claim 9, wherein the second damping member is fixed at one end of the shock absorber rod, and a gap exists between an outer wall surface of the second damping member and an inner wall surface of the accommodation cavity.

16. The washing machine according to claim 9, further comprising:

a mounting nut provided at one end of the shock absorber rod to fix the second damping member.

* * * * *